(12) United States Patent
Oba et al.

(10) Patent No.: US 6,430,037 B1
(45) Date of Patent: Aug. 6, 2002

(54) COMPUTER UNIT KEYBOARD AND KEYBOARD COVER

(75) Inventors: Haruo Oba; Kunihito Sawai, both of Kanagawa; Hiroji Yoshino, Chiba, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/457,304

(22) Filed: Dec. 9, 1999

(30) Foreign Application Priority Data

Dec. 11, 1998 (JP) .......................................... 10-353095
Feb. 17, 1999 (JP) .......................................... 11-039172

(51) Int. Cl.⁷ ................................................ G06F 1/16
(52) U.S. Cl. ...................... 361/680; 361/679; 361/683; 361/686; 361/724
(58) Field of Search ................................. 361/679–689, 361/724–727

(56) References Cited

U.S. PATENT DOCUMENTS 5,175,672 A * 12/1992 Conner et al. ............... 361/393
6,108,200 A * 8/2000 Fullerton .................... 361/686

* cited by examiner

Primary Examiner—Darren Schuberg
Assistant Examiner—Yean-Hsi Chang
(74) Attorney, Agent, or Firm—Jay H. Maioli

(57) ABSTRACT

In a computer unit having a keyboard and a keyboard cover, the stowing efficiency of the keyboard is improved by providing a concavity on the other surface of a keyboard opposite to one surface on which various control keys are arranged to enter various commands to receive a base that supports the display panel of the display. By inserting the base into the concavity, the keyboard can be stowed effectively using the base without using any storing member. Thus, the computer unit in which the stowing efficiency of the keyboard is improved can be accomplished. Moreover, a keyboard cover is provided for the keyboard which can be stowed effectively using the base of the display unit, so that the keyboard cover can be integrally stowed with the keyboard without a special stowing space. As a result, the keyboard cover in which the stowing efficiency is improved can be accomplished.

16 Claims, 17 Drawing Sheets

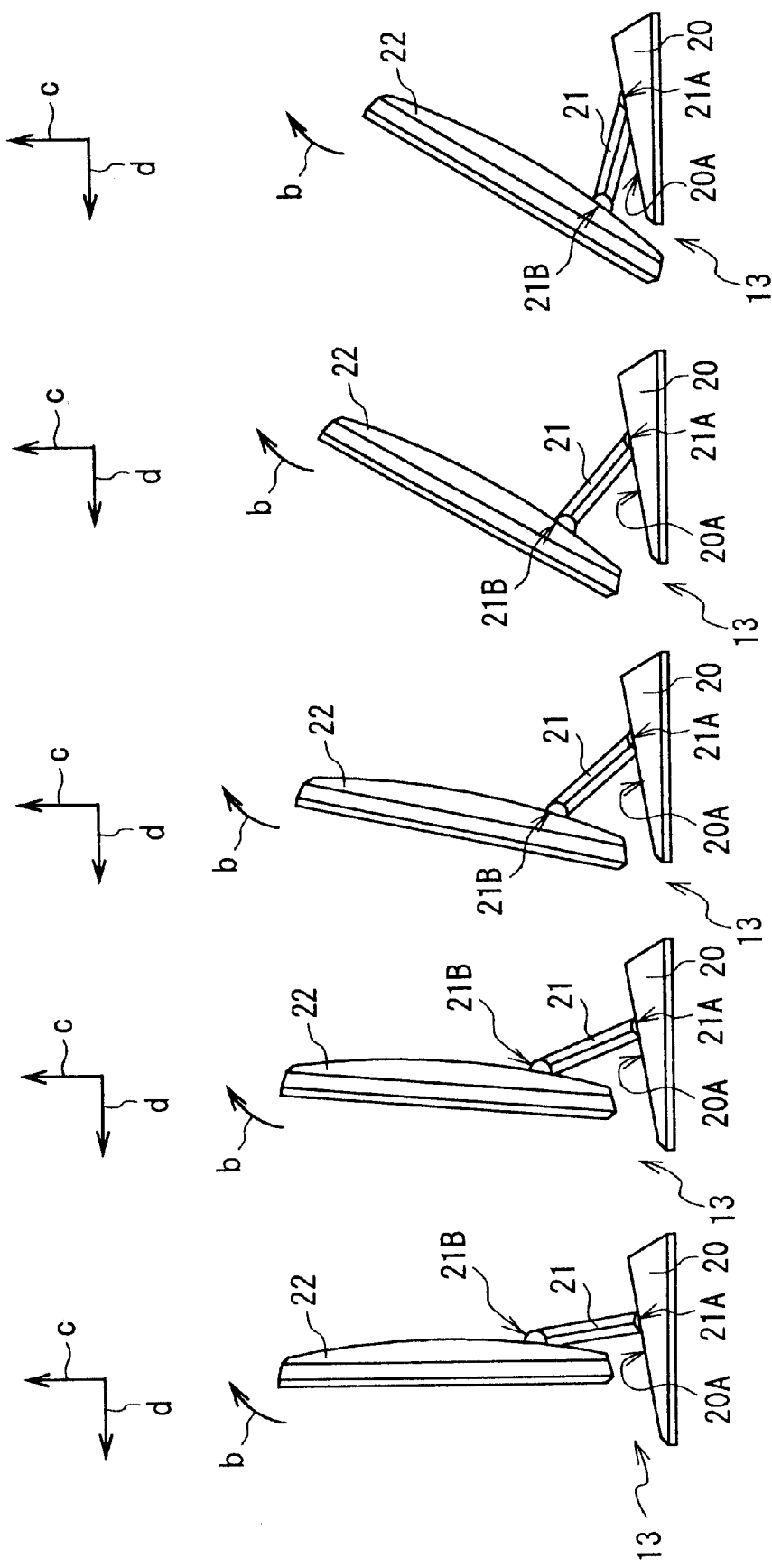

COMPUTER UNIT KEYBOARD AND KEYBOARD COVER

BACKGROUND OF THE INVENTION

1. Field of the Invention

The present invention relates to a computer unit, a keyboard and a keyboard cover, and more particularly, is suitably applied to a desktop personal computer and a keyboard and a keyboard cover used therewith.

2. Description of the Related Art

Some personal computers are constructed by connecting a liquid crystal display to a main body part that executes various signal processing, with a prescribed first signal cable and to a keyboard with a prescribed second signal cable.

In such a personal computer, various commands entered with the keyboard are supplied to the main body part through the second cable, and the main body part executes signal processing according to these various commands.

At this time, furthermore, the main body part transmits a video signal indicating the content of the signal processing to the liquid crystal display through the first cable to display an image based on the video signals on a liquid crystal panel provided on the liquid crystal display. Thus, a operator can visually confirm the contents of the signal processing content.

The keyboard has spaces between the keyboard itself and a set of keys and between the keys, so that it is easy for dust to enter inside the keyboard and it is difficult to remove the entered dust because a keyboard of a desktop computer or the like does not have a cover when it is not used. Therefore, it has been tried to cover a surface having keys arranged thereon (hereinafter, referred to as a key-arranged surface) with a keyboard cover made of transparent resin which has a form suiting the arranged keys, and enabling key operation even if the cover is put on, or to cover the key-arranged surface with a keyboard cover made of cloth when the keyboard is not used.

On the other hand, since a surface on which a keyboard is put and the lowermost keys of the arranged keys are on different levels, the hands of a operator bend backward when using the keys and he often gets tired from pushing the keys. This is the reason a palm rest is utilized to get rid of the above difference.

By the way, in such a personal computer, a liquid crystal display is generally disposed at a stated position on a desk, and the keyboard is disposed at a desired position on the panel side of the liquid crystal display. The operator manipulates the keyboard under such an arrangement.

However, the case where a desk which a personal computer is put on is comparatively narrow and in addition, the case of spreading reference materials or the like on the desk during a pause in a keyboard operation, it is necessary to temporary stow the keyboard into some stowing place. However, it is difficult to keep a keyboard stowing space on such a comparatively-narrow desk.

To solve the above problem, some personal computer is constructed as shown in FIGS. 1A and 1B.

Such a personal computer 1 is constructed by connecting a main body part (not shown in the figure) to a cathode-ray tube 3 with a first signal cable 2 and to a keyboard 5 with a second signal cable 4.

In this case, in the personal computer 1, the cathode-ray tube 3 is disposed on a stand 6 having legs 6A and 6B. While using the keyboard 5, this is disposed at a desired position on the panel side 3A of the cathode-ray tube 3 (FIG. 1A). On the other hand, while spreading materials on the desk as described above, the keyboard 5 is moved between the legs 6A and 6B of the stand 6 to be stowed under the cathode-ray tube 3 (FIGS. 1A and 1B).

However, space between the legs 6A and 6B of the stand 6 is decided depending on the longitudinal length of the keyboard 5, and the stand 6 is made so as to be larger than the keyboard 5. Therefore, setting space for the stand 6 that is larger than the keyboard 5 must be kept in order to keep the stowing space for the keyboard 5 under the cathode-ray tube 3, so that the stowing efficiency is remarkably low.

On the other hand, a keyboard cover made of cloth which is used for preventing dust from entering needs its stowing space while being not used, and it is difficult to keep the stowing space, especially, on the narrow desk. Further, with reference to a keyboard cover made of transparent resin, keys can be seen even if the keyboard is covered with it, so that the keyboard does not look good while being not used. In addition, while the keyboard is covered with it, it is difficult to see letters written on the keys even if it is transparent. And the keyboard covered with it is no good to touch while being used, so that it is difficult to push the keys while the key-arranged surface is covered with it.

In addition, the conventional palm rest and the keyboard are not integrated, so that, off course, stowing space is required for the time when the palm rest is not used and it is difficult to keep the stowing space on, especially, the narrow space.

SUMMARY OF THE INVENTION

In view of the foregoing, an object of this invention is to provide a computer unit, a keyboard and a keyboard cover which can improve the stowing efficiency for the keyboard.

The foregoing object and other objects of the invention have been achieved by the provision of a computer unit having a keyboard to give various commands to a main body part which execute various signal processing and a display means for displaying the contents of signal processing supplied from the main body part on a display panel. And the keyboard has a concavity to insert a base for supporting the display panel as the display means on the side opposite to the side on which various control keys are arranged to enter the various commands to be supplied to the main body part.

By bringing the keyboard close to the display panel and inserting the base into the concavity, the keyboard can be stowed effectively using the base without using any special storing member.

Moreover, in the present invention according to claim 4 to 6, a concavity is provided on the other side of the keyboard, opposite to one side on which various control keys are disposed to enter prescribed commands, to insert the base for supporting a prescribed display panel.

By bringing the keyboard close to the display panel and inserting the base into the concavity, the keyboard can be stowed effectively using the keyboard and the base without using any storing member.

Further, in the present invention, for the keyboard according to claim 7, a keyboard cover having a first and second parts connected to each other at a connecting portion is provided. The entire flat form of the first and second parts suits the form of the key-arranged surface of the keyboard, so that when the keyboard is not used, the first and the second parts open in a flat become the keyboard cover.

Furthermore, the first part has a first rocking shaft on the side opposite to that for connecting the second part, and is connected to the edge part on the lowest row of keys in the keyboard with the first rocking shaft. The part for connecting the first part to the second part is also a rocking shaft and referred to as a second rocking shaft. Therefore, by opening the first and the second parts covering the keyboard and bringing them close to an manipulator, they are bend in a mount shape by rocking centering the first and the second rocking shafts, and are folded on the operator's side rather than the keyboard.

In addition, the second part is wider than the first part in the vertical direction to the first and the second rocking shafts. Therefore, when the first and the second parts are folded, the edge part of the second part opposite to the first part is placed on the edge side of the lowest row of keys in the keyboard. That is, when the keyboard is used, a triangular space is formed by the first part and the second part which is slant from the edge of the keyboard on the lowest row of keys to the keyboard placing surface, so that the folded first and second parts are changed to the palm rest.

Furthermore, in the present invention, projections are provided on the both sides of the keyboard in a vertical direction to the first and second rocking shafts of the keyboard cover so as to project toward the keyboard cover which covers the keyboard. As a result, a gap between the keyboard and the keyboard cover is narrowed on the both sides of the keyboard in the vertical direction to the first and second rocking shafts of the keyboard cover and moreover, the keyboard and the key cover look one body.

Furthermore, in the present invention, angle adjusting parts for adjusting an angle the keyboard are provided on the surface opposite to the key-arranged surface and on the side opposite to the lowest row of keys. As a result, the angle of the keyboard can be adjusted with the angle adjusting parts so as to easily manipulate the keys in using the keyboard.

In addition, the angle adjusting parts for adjusting the angle of the keyboard is provided on the surface opposite to the key-arranged surface and on the side opposite to the lowest row of keys, so that even if the angle of the keyboard is adjusted with the angle adjusting parts, the height of the edge of the keyboard on the lowest row side of keys from the keyboard placing surface is not changed. In addition, the keyboard cover can rock with the first and second rocking shafts as a center, so that even if the angle of the keyboard is adjusted with the angle adjusting parts, the keyboard cover used as a palm rest does not rise up from the keyboard placing surface.

Furthermore, in the present invention, the first and second parts are connected with the connecting part, the entire plane surface of the first and second parts suit the form of the surface having keys arranged thereon suits, so that when the keyboard is not used, the first and second part are opened in a flat form to become the keyboard cover.

In addition, the fist parts has the first rocking shaft on the edge opposite to the second part, and the connecting part between the first and second part is the second rocking shaft. Therefore, if the first part is attached to the edge of the keyboard on the lowest row side of keys with the first rocking shaft, the first and second parts are bent in a mountain shape with the first and second rocking shaft as a center by opening the first and second parts covering the keyboard and by bringing them close to the manipulator, and moreover, they are folded on the manipulator side rather than the keyboard.

And the width of the second part is a wider than that of the first part in the vertical direction to the first and second rocking shafts, so that when the first and second parts are folded, the edge of the second part opposite to the first part are placed on the edge of the keyboard on the lowest row side of keys. That is, when the keyboard is used, a triangular space is formed by the folded first part and the folded second part which is slant from the edge of the keyboard on the lowest row side of keys to the keyboard placing surface, so that the folded first and second parts are changed to the palm rest.

Further, in the present invention, a pair of tongue parts, which is projecting toward the keyboard under the state where the second part is above the keyboard, is provided on the both ends of the second part in the vertical direction to the second rocking shaft. So that even if the first and the second parts are made of thin plates, the first and the second parts can be easily opened and folded by putting the fingers of the both hands to the pair of tongue parts from the both sides of the second part. Moreover, since the tongue parts project toward the key-arranged surface of the keyboard, the tongue parts do not project outward in either state where the first and the second parts are used as the keyboard cover or as the palm rest.

Further, in the present invention, the keyboard cover is removable from the keyboard, so that the keyboard cover can be attached/removed to/from the keyboard as required.

Further, in the present invention, sticking tape is provided to attach the keyboard cover to the keyboard, so that the keyboard cover can be attached to a keyboard which does not have a hinge structure.

Furthermore, in the present invention, ribs are provided on the first and second parts, so that it is hard to deform the first and second parts even if the power is added from outside to the first and second parts. In addition, the ribs are provided on the surfaces of the first and second parts which face the keyboard, so that they are not bare outside in either state where the first and the second parts are used as the keyboard cover or as the palm rest. In addition, the ribs are provided on the surfaces of the first and second parts which face the keyboard and at the parts which do not touch the keys, which prevents the keys of the keyboard from being pressed by the keyboard cover even when the first and second parts are used as a keyboard cover.

Furthermore, in the present invention, the entire plane surface of the first and second parts corresponds to only a part other than hot keys on the keyboard, so that it can cover the keyboard not only when the keyboard is not used but also when the keyboard is used but the keys other than hot keys are not used.

Furthermore, in the present invention, the projections are provided on the surface of the first and second parts, which do not face the keys of the keyboard. As a result, it is possible to prevent the keys of the keyboard from being pressed by the keyboard cover because the projections touch the parts other than the keys of the keyboard when the first and second pats are used as a keyboard cover.

Furthermore, in the present invention, the projections are provided so as to face each other when they swing centering the first and second rocking shaft and to fit each other when the first and second parts are used as a palm rest.

The nature, principle and utility of the invention will become more apparent from the following detailed description when read in conjunction with the accompanying drawings in which like parts are designated by like reference numerals or characters.

BRIEF DESCRIPTION OF DRAWINGS

In the accompanying drawings:

FIGS. 5A to 5E are side views explaining the motions of an arm;

FIG. 17 is a plan view showing the situation where the keyboard cover is used as a palm rest and a part of the keyboard is lost, according to another embodiment in which the keyboard cover is attached to the rear surface of the keyboard using both-sided adhesive tape, surface zipper, or the like.

DETAILED DESCRIPTION OF THE EMBODIMENT

Figure 2:
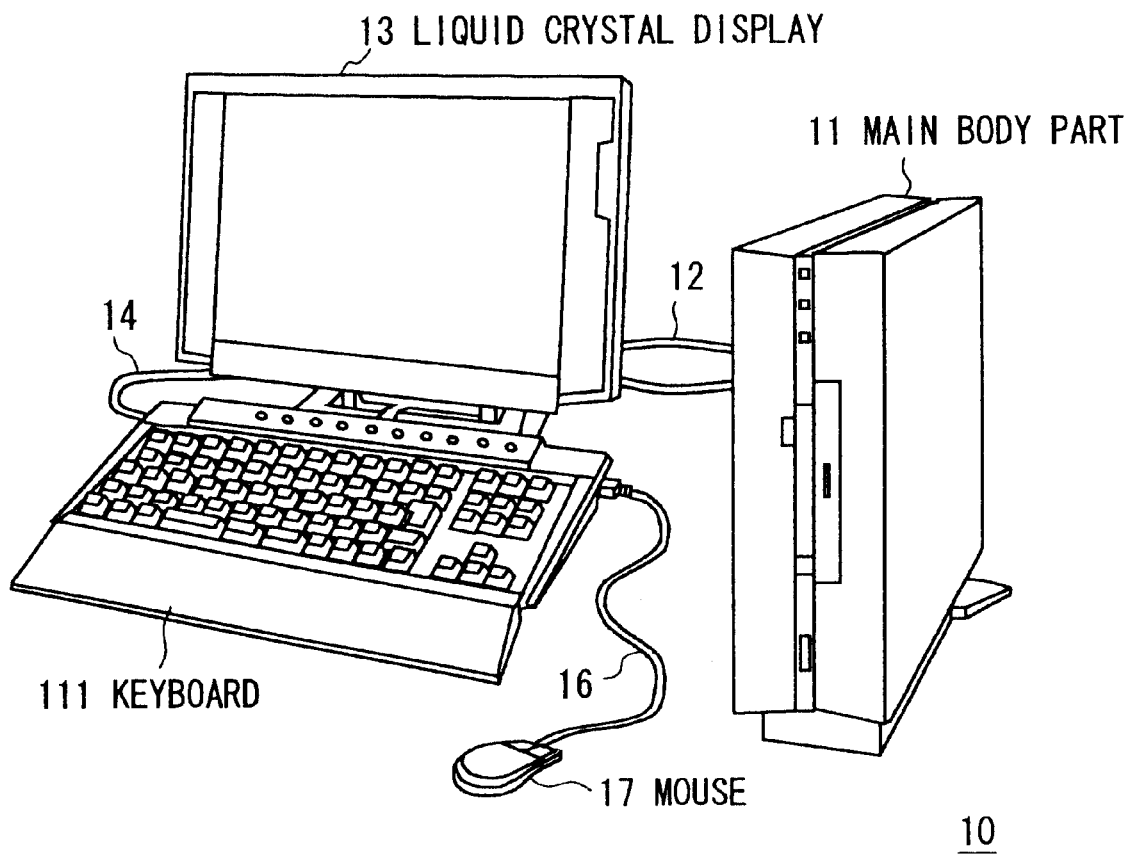
FIG. 2 is an external view showing an embodiment of a general configuration of a personal computer according to the present invention.

Preferred embodiment of this invention will be described with reference to the accompanying drawings:

Referring to FIG. 2, 10 generally shows a personal computer to which the present invention is applied. To a main body part 11 that executes various signal processing, a liquid crystal display 13 is connected with a display cable 12, and a keyboard 111 is connected with a keyboard cable 14. A mouse 17 is connected to the above keyboard 111 with a mouse cable 16.

Figure 3A:
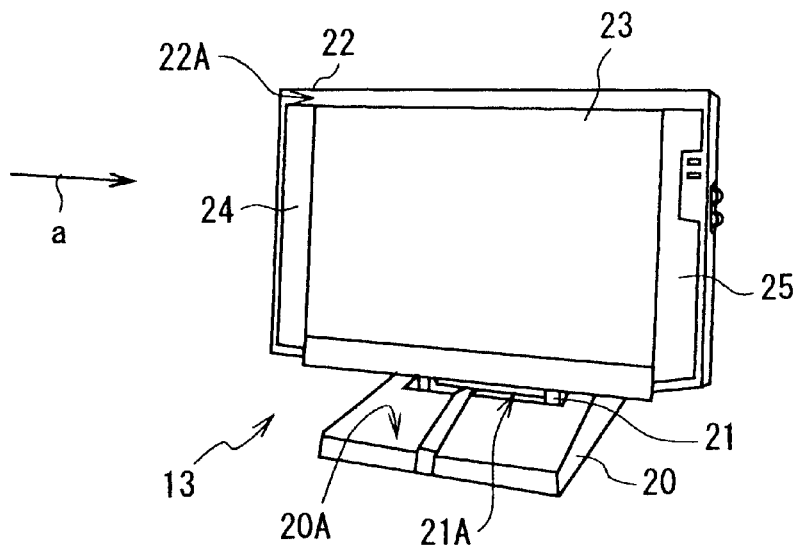
FIGS. 3A and 3B are on external view and a side view showing the structure of a liquid crystal display.
Figure 3B:
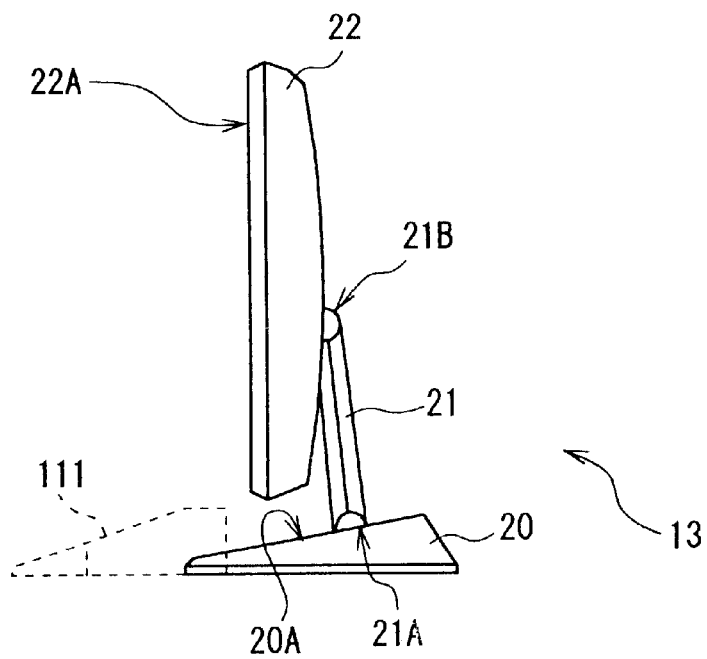

Here, as shown in FIGS. 3A and 3B, the liquid crystal display 13 is formed separately from the keyboard 111. One end 21A of an arm 21 is supported in an almost center on one surface 20A of a wedge-shaped stand 20, and a panel 22 is supported on the other end 21B of the arm 21.

A liquid crystal panel 23 is disposed in the center of the front surface 22A of this panel 22. Speakers 24 and 25 are respectively disposed on the right and left sides of the front surface 22A with an arrow "a" as a reference.

In this liquid crystal display 13, when a video signal and an audio signal are supplied from the main body part 11 (FIG. 2) through the display cable 12 (FIG. 2), an image is displayed based on the video signal on the liquid crystal panel 23 and a sound is given from the speakers 24 and 25 based on that audio signal.

Figure 4:
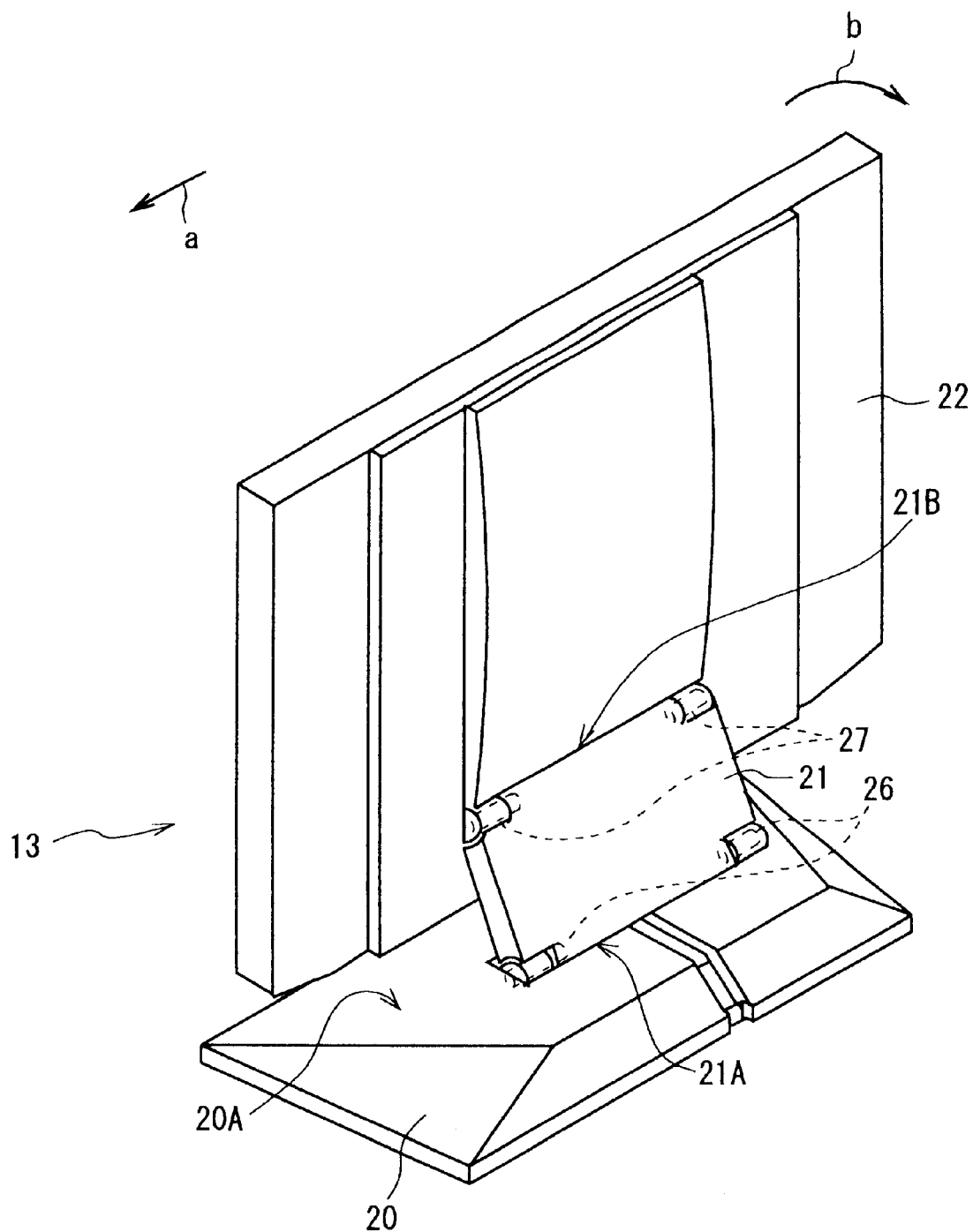
FIG. 4 is a schematic perspective view explaining adjustment of the panel of the liquid crystal display.

FIG. 4 is a perspective view showing the rear of the liquid crystal display 13. In this liquid crystal display 13, first supporting shafts 26 are provided inside the one end 21A of the arm 21 in that their longitudinal direction is almost parallel to the right-left direction. The above arm 21 is pivotally supported so as to rotate in a direction shown by an arrow "b" with respect to the stand 20 centering the first supporting shaft 26 (hereinafter, this is referred to as a clockwise direction) and in the opposite direction (hereinafter, this is referred to as counterclockwise direction).

Second supporting shafts 27 are provided inside the other end 21B of the arm 21 in that the longitudinal direction is almost parallel to the right-left direction. And the panel 22 is pivotally supported so as to rotate in a clockwise direction and a counterclockwise direction centering that second supporting shafts 27 with respect to the arm 21.

FIGS. 5A to 5E show side views of the situation in which the arm 21 is turned centering the first shafts 26. The arm 21 can be turned in clockwise direction and counterclockwise direction with respect to the stand 20 centering the first supporting shafts 26 within a prescribed movable range, for example, from a prescribed position where the longitudinal direction is almost parallel to the upper direction shown by an arrow "c" (FIG. 5A) to a prescribed position where the arm 21 slants forward at a prescribed angle shown by an arrow "d" (FIG. 5E).

Figure 6A:
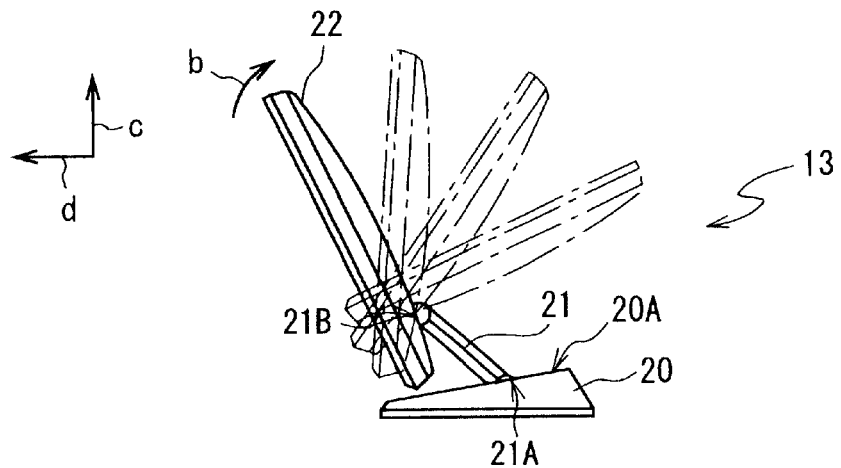
FIGS. 6A and 6B are side views explaining the motions of the panel.
Figure 6B:
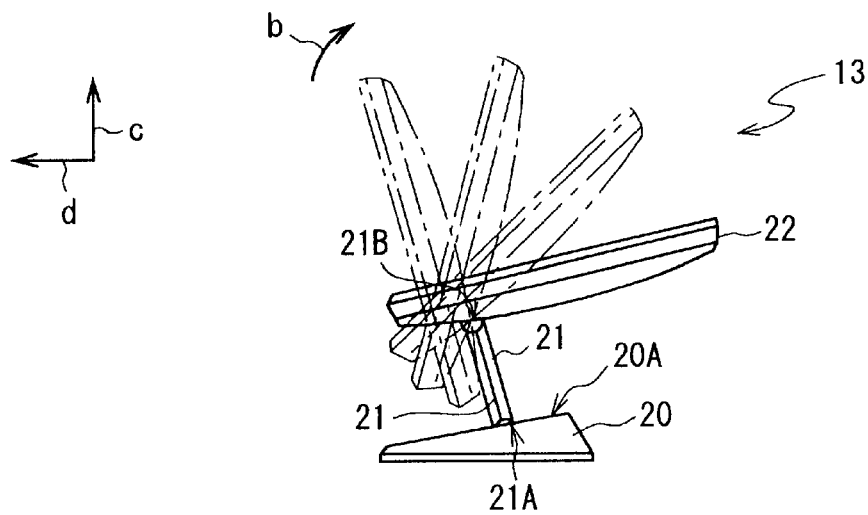

Next, FIGS. 6A and 6B show side views in a situation in which the arm 21 is turned centering the second shafts 27. The panel 22 can be turned in clockwise direction and counterclockwise direction with respect to the arm 21 centering the second supporting shafts 27 within a prescribed movable range, for example, from a prescribed position where the front surface 22A is almost parallel to the longitudinal direction of the arm 21 to a prescribed position where the arm 21 is almost orthogonal to the above longitudinal direction.

In this manner, in this liquid crystal display 13, since the arm 21 and the panel 22 are turned in clockwise direction and counterclockwise direction, the above panel 22 can be adjusted at a desired oblique angle and height; that improves a visibility in the liquid crystal panel 23 and reduces fatigue of the on eyes and neck or the like.

By the way, a box for attaching the one end 21A of the arm 21, not shown in Fig., (hereinafter, this is referred to as stand box) is provided inside the stand 20. With respect to this stand box, the thickness is selected so as to have a predetermined weight and the shape is selected so that the stand is stably attached.

Further, considering a dead load of this arm 21, a weight of the panel 22 and the center of gravity of the stand 20, the almost center on one side 20A of the above stand 20 is selected as a position for attaching the end 21A of the arm 21.

Thus, even if this liquid crystal display 13 is excessively slanted by turning the panel 22 in clockwise direction or counterclockwise direction, the overall weight balance can be kept, and the display 13 prevents from falling in a turning direction of the panel 22.

Figure 7A:
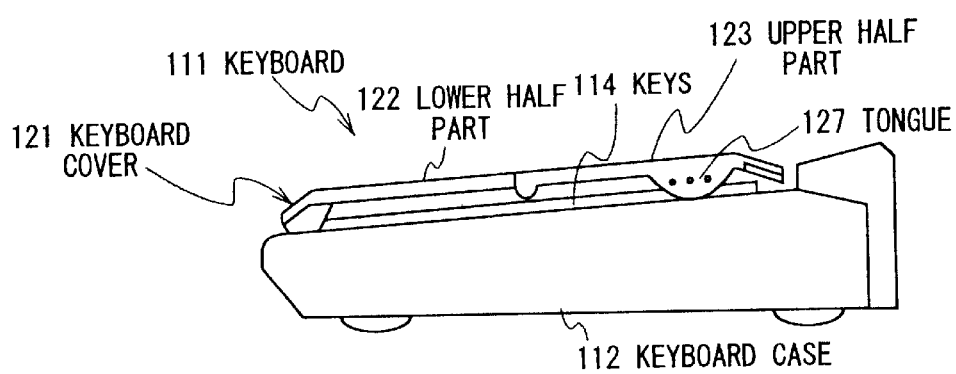
FIGS. 7a to 7c are side views sequentially showing an operation to change a keyboard cover to a palm rest.
Figure 8:
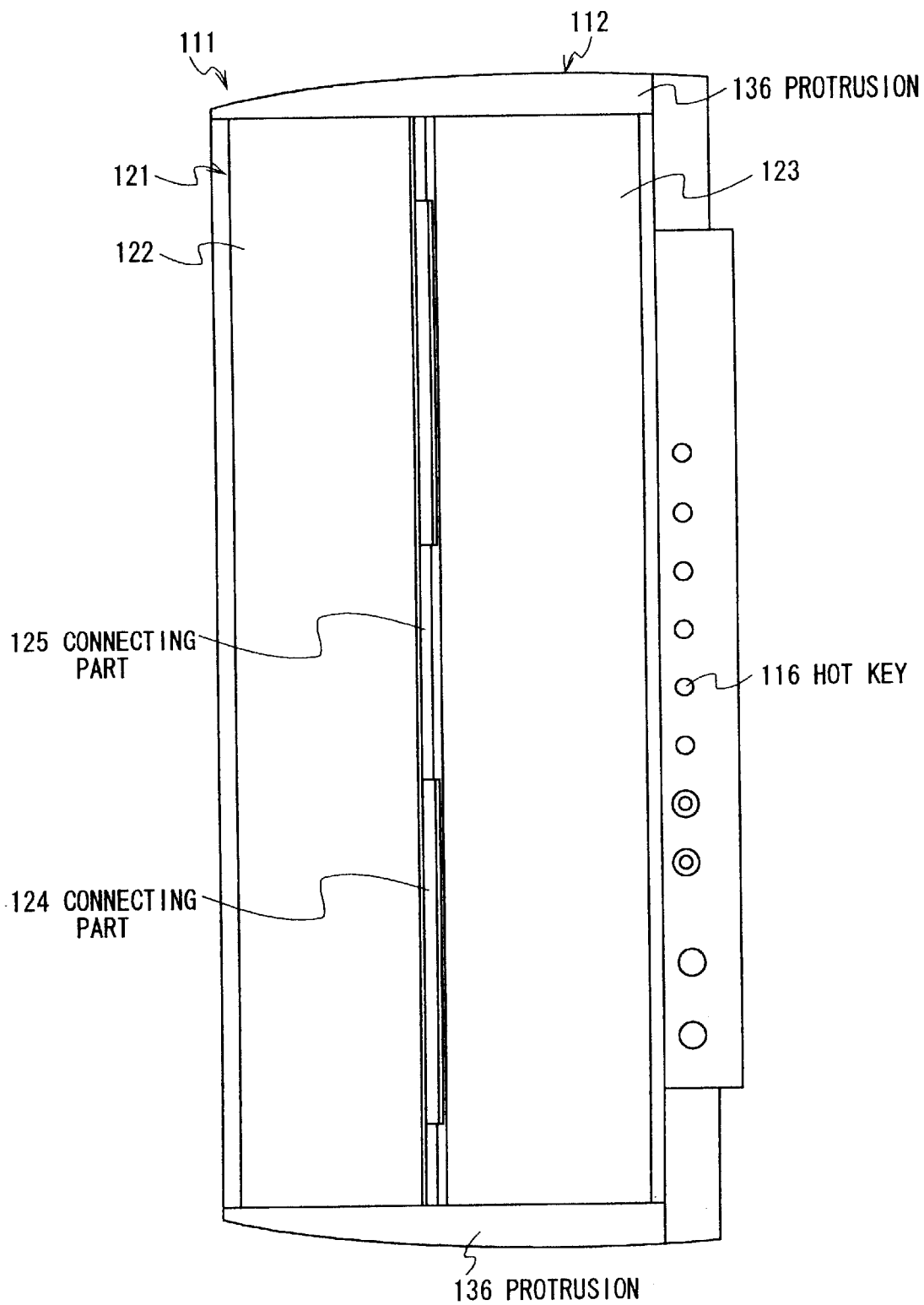
FIG. 8 is a plan view in a state where a key-arranged surface is covered with the keyboard cover.

FIGS. 7A and 8 are side and top views in the situation in which the keyboard cover 121 covers the keys 114 of the keyboard 111.

Figure 7B:
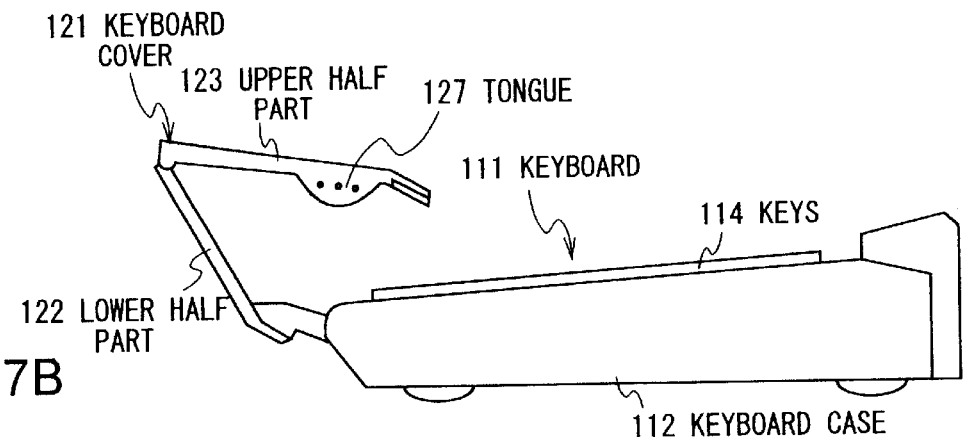
Figure 7C:
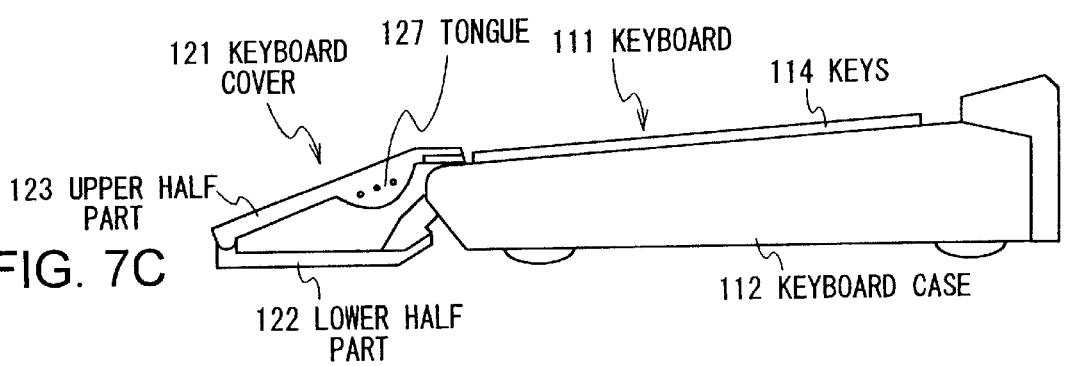
Figure 9:
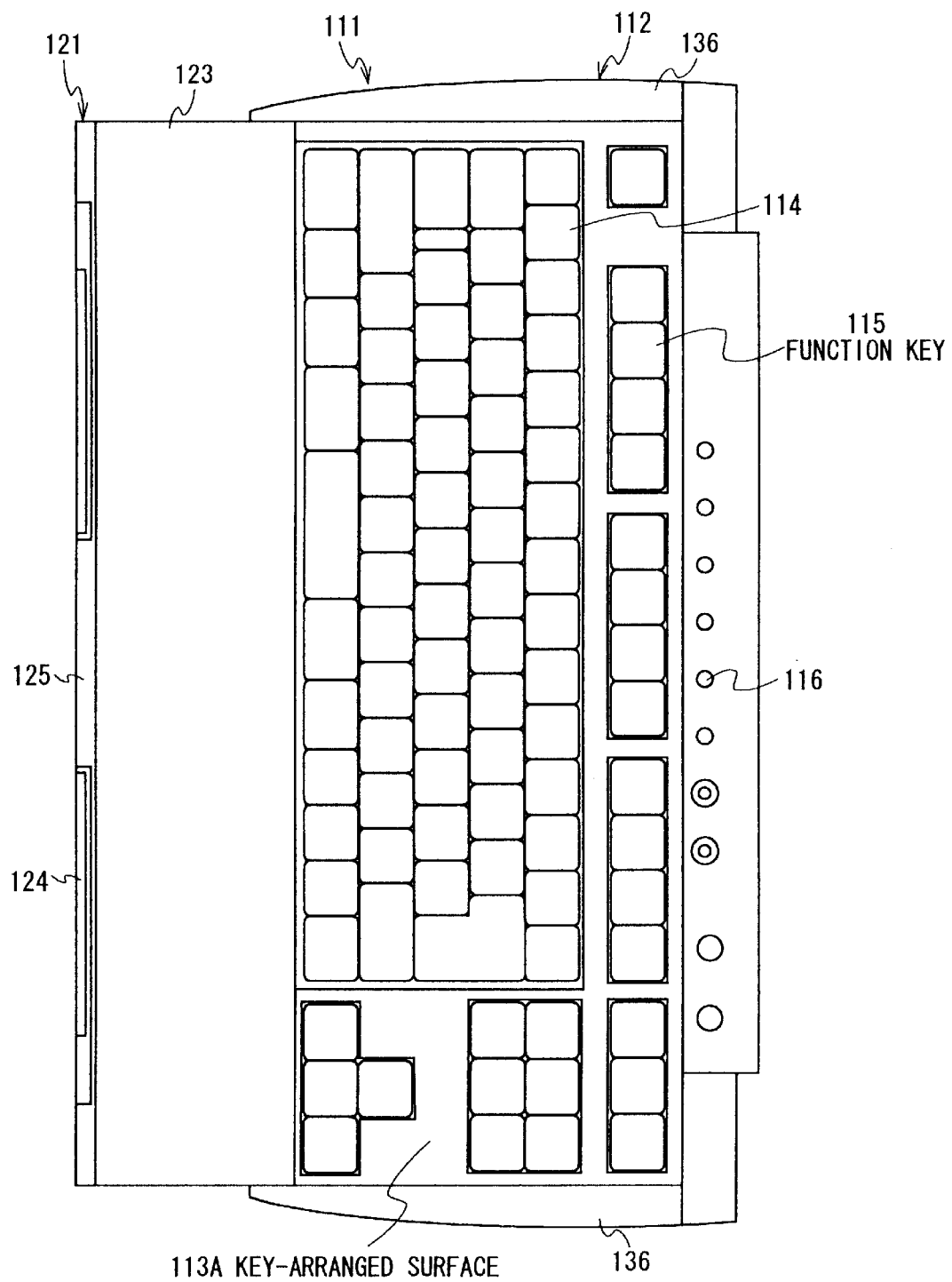
FIG. 9 is a plan view in a state where the keyboard cover is used as the palm rest.

FIGS. 7C and 9 are side and top views in the situation in which the keyboard cover 121 is used as a palm rest.

FIG. 7B is a side view showing the transition from the situation of the keyboard cover 121 shown in FIGS. 7A and 8 to the situation of the keyboard cover 121 shown in FIGS. 7C and 9.

Figure 10:
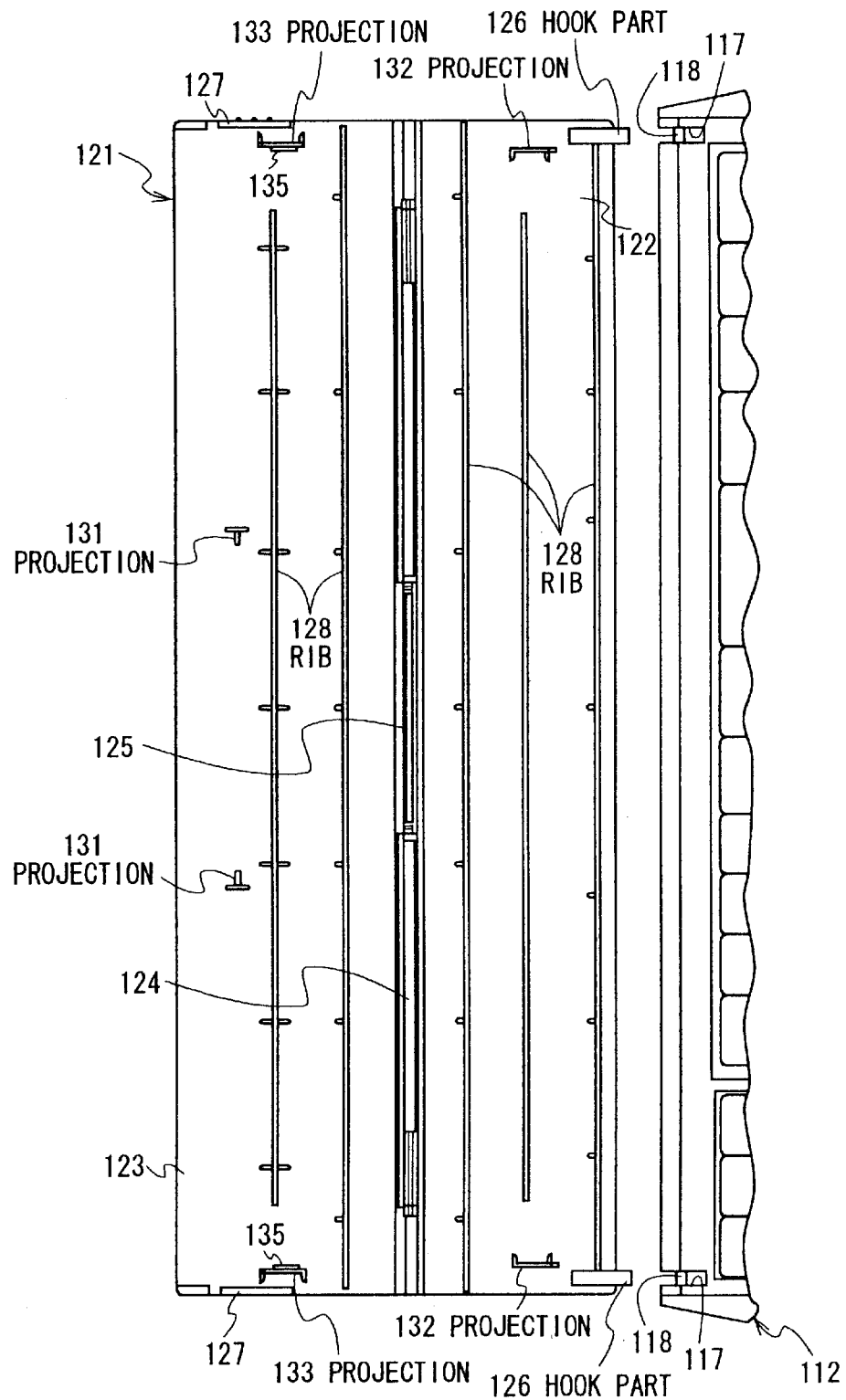
FIG. 10 is a plan view showing the surface of the keyboard cover which faces the key-arranged surface and a part of the key-arranged surface.

As shown in FIG. 9, normal keys 114, function keys 115, hot keys 116 are arranged on the key-arranged surface 113A that is the front face of a keyboard case 112 of the keyboard 111. As shown in FIG. 10, recessed parts 117 are provided near the both ends and on the edge part of the keyboard case 112 on the lowest row side of the keys 114, and a pin 118 is provided at this recessed part 117.

As shown in FIGS. 7A to 7C, 8 and 9, the keyboard cover 121 is attached to the keyboard case 112. As shown in FIGS. 8 and 10, the keyboard cover 121 is composed of a first half cover 122 and a second half cover 123 which are connected to each other by fitting uneven parts and inserting a pin at the connecting parts 124 and 125 so as to move. However, it is also allowable that the first half cover 122 and the second half cover 123 are integrally formed using such polypropylene that it is soft and is hard to be broken even when being bent, and they can bend at the connecting parts.

Figure 11:
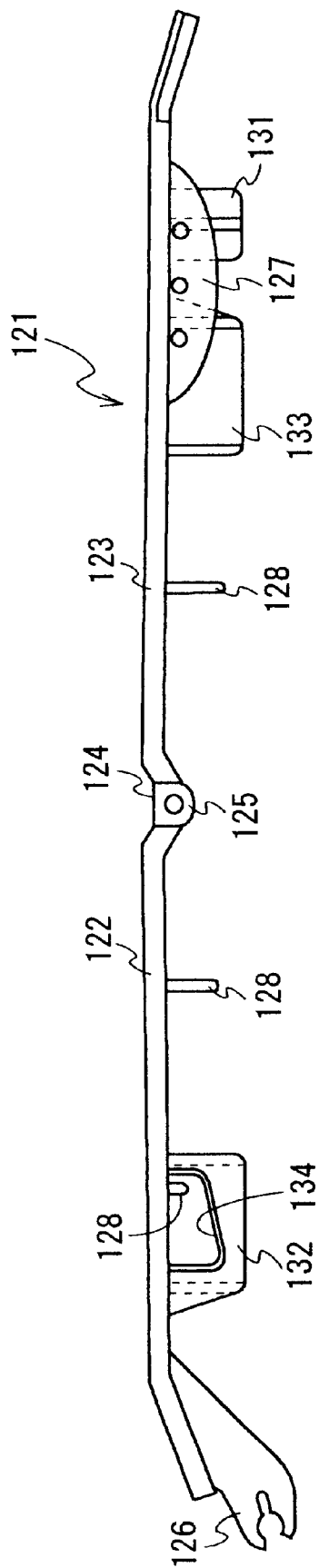
FIG. 11 is a side view of the keyboard cover.

FIGS. 10 and 11 are back and side views of the keyboard cover 121.

As shown in FIGS. 10 and 11, hook parts 126 are provided near the both ends of the first half cover 122 on the opposite side to the connecting parts 124. As shown in FIGS. 8 and 9, the entire keyboard cover 121 is attached to the keyboard case 112 by fitting these hook parts 126 to the pins 118 so as to rotate. Note that, the second half cover 123 is wider than the first half cover 122 in the vertical direction to the connecting parts 124 and 125.

As shown in FIGS. 10 and 11, tongue parts 127 are provided at the both ends of the second half cover 123 in the parallel direction to the connecting parts 124 and 125. Ribs 128 and projections 131 are provided on the surface of the first half cover 122 and the second half cover 123 opposite to the key-arranged surface 113A. Projections 132 and 133 are also provided near the hook parts 126 and the tongue parts 127, respectively. A through hole 134 is provided in the projection 132, and a convex part 135 is provided on the projection 133.

As shown in FIGS. 8 and 9, protruding parts 136 more protruding than the key-arranged surface 113A are provided at the both ends of the front face of the keyboard case 112.

In such a keyboard 111, while it is not used, the first half cover 112 and the second half cover 123 of the keyboard cover 121 which are opened in a flat cover the key-arranged surface 113A as shown in FIGS. 7A and 8. Besides, the protruding parts 136 are also provided at the both ends of the key-arranged surface 113A of the keyboard case 112, so that a gap between the key-arranged surface 113A and the the keyboard cover 121 is narrow at the both ends of the key-arranged surface 113A and moreover, the keyboard case 112 and the keyboard cover 121 is like one body and look good.

As obvious from FIG. 8, however, the keyboard cover 121 does not cover the hot keys 116, so that in the case where a request to execute processing of turning the power of the main body 11 (FIG. 2) on or processing from turning the power of the main body 11 on up to start predetermined application software for Internet, E-mail, or the like is made, the hot keys 116 can be manipulated even when the key-arranged surface 113A is covered with the keyboard cover 121.

When the key-arranged surface 113A is covered with the keyboard cover 121, each rib 128 is placed between keys 114; the projections 131 are abutted on the key-arranged surface 113A between the line of keys 114 and a line of the function keys 115; and the projections 132 and 133 are abutted on the other parts than the keys 114 at the both ends of the key-arranged surface 113A. Therefore, even if the key-arranged surface 113A is covered with the keyboard cover 121, the keys 114 and the function keys 115 are prevented from being pressed by the keyboard cover 121.

On the other hand, when using the keyboard 111, a manipulator puts fingers of the both hands to a pair of the tongue parts 127 from the both sides of the second half cover 123, lifts up to the first half cover 122 and the second half cover 123 and pulls them toward himself. As a result, the first half cover 122 and the second half cover 123 are bent in a chevron form as shown in FIG. 7b centering the connecting parts 124 and 125, and the pins 118 and the hook parts 126 and moreover, the first half cover 122 and the second half cover 123 are folded on the operator's side nearer than the keyboard case 112 as shown in FIGS. 7c and 9.

Since the send half cover 123 is wider than the first half cover 122 in the vertical direction to the connecting parts 124 and 125 as described above, the edge of the second half cover 123 opposite to the first half cover 122 is placed on the edge of the keyboard case 112 on the recessed parts 117 side. That is, the folded second half cover 123 becomes a slanted surface from the edge of the keyboard case 112 on the recessed part 117 side to a placing surface for the keyboard case 112, so that a triangular space is formed by the folded first half cover 122 and second half cover 123, and the folded first half cover 122 and second half cover 123 can used as a palm rest. Thus, if the keyboard cover 121 is made of a soft material and is coated so as not to slip, the keyboard 114 can be manipulated with comfortable touch.

The projections 132 and 133 are provided on the first half cover 112 and the second half cover 123 so as to face each other when the aformentioned rocking is performed. In addition, they are fit each other with a click by fitting the recessed parts 135 into the through holes 134. Therefore, when the first half cover 122 and the second half cover 123 are used as the palm rest, they fit each other with a click.

Note that, as described in FIG. 10, the hook part 126 is fit to the pin 118, so that the keyboard cover 121 is attached to the keyboard case 112. Therefore, the keyboard cover 121 can be removed from the keyboard case 112 by removing the hook part 126 from the pin 118. That is, the keyboard cover 121 is removable from the keyboard case 112, so that the keyboard cover 121 can be attached/removed to/from the keyboard case 112 as required.

Figure 12:
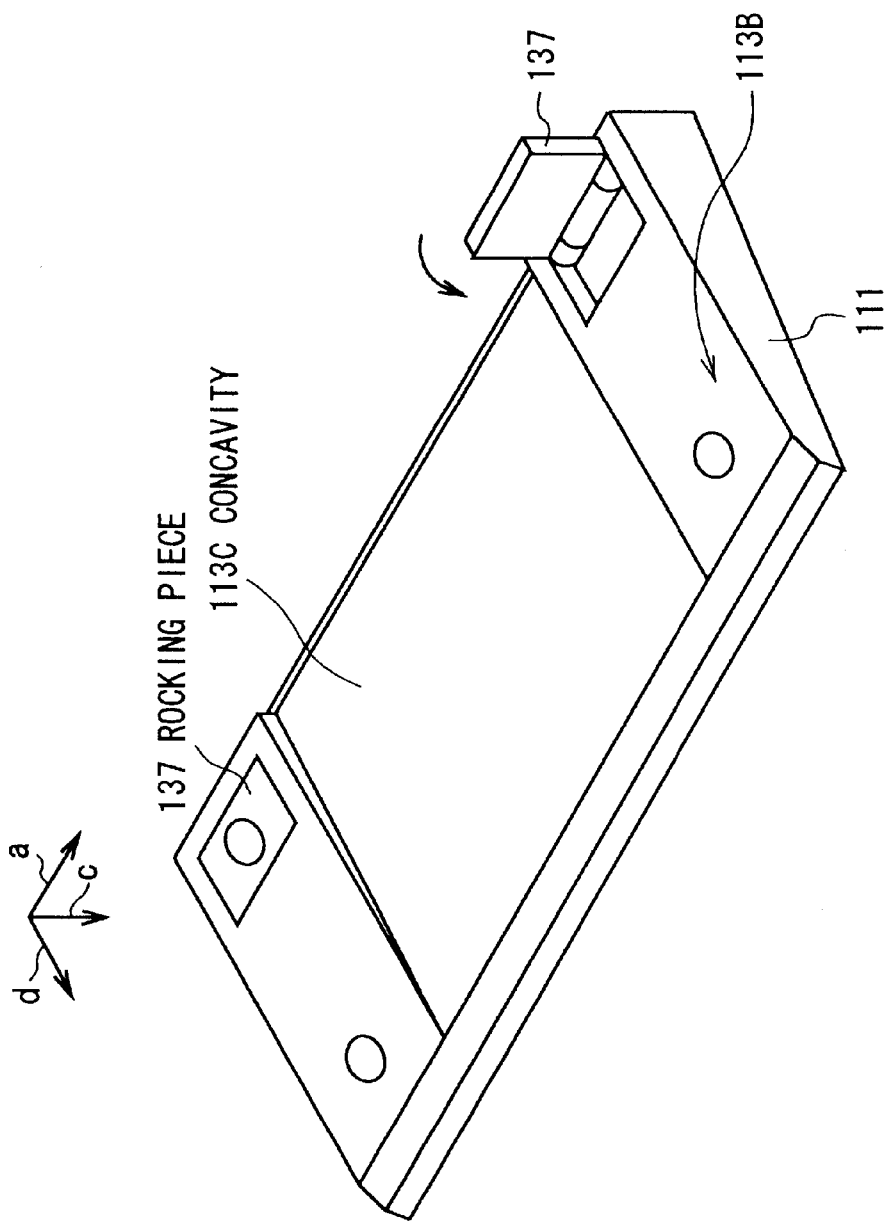
FIG. 12 is a perspective view showing the rear side of the keyboard.

FIG. 12 is a perspective viewer of the rear of the keyboard 111. As shown in FIG. 12, rocking pieces 137 which are a part of the keyboard case 112 are provided on the both sides of the surface 113B which does not face the key-arranged surface 113A of the keyboard case 112 and on the liquid crystal display 13 (FIG. 2) side of the time when the keyboard 111 is manipulated.

These rocking pieces 137 are flexible at a predetermined rocking angle. And an angle of the keyboard case 112 with respect to the placing surface for the keyboard case 112 is adjusted by fixing the rocking angle with respect to the keyboard case 112. Therefore, the angle of the keyboard 111 respect to the placing surface for the keyboard case 112 can be adjusted.

Note that, the rocking pieces 137 are provided near the hot keys 116 on the rear surface 113B of the keyboard case 112, so that even if the angle of the keyboard case 112 with respect to the placing surface for the keyboard case 112 is adjusted with the rocking pieces 137, the height from the placing surface for the keyboard case 112 to the edge of the keyboard case 112 on the recessed part 117 side hardly changes, and the keyboard cover 121 being used as a palm rest does not float from the placing surface for the keyboard case 112.

Furthermore, a concavity 113C is provided along the front-to-rear direction in the almost center of the other surface 113B of the keyboard case 112. The width of the concavity 113C is selected according to the width of the front side of the stand 20 (FIG. 3), and its depth is selected according to the inclination angle of the one side 20A of the stand 20 in such a manner that the depth on the liquid crystal display 13 (FIG. 2) side is deeper than that on the front side.

Figure 13:
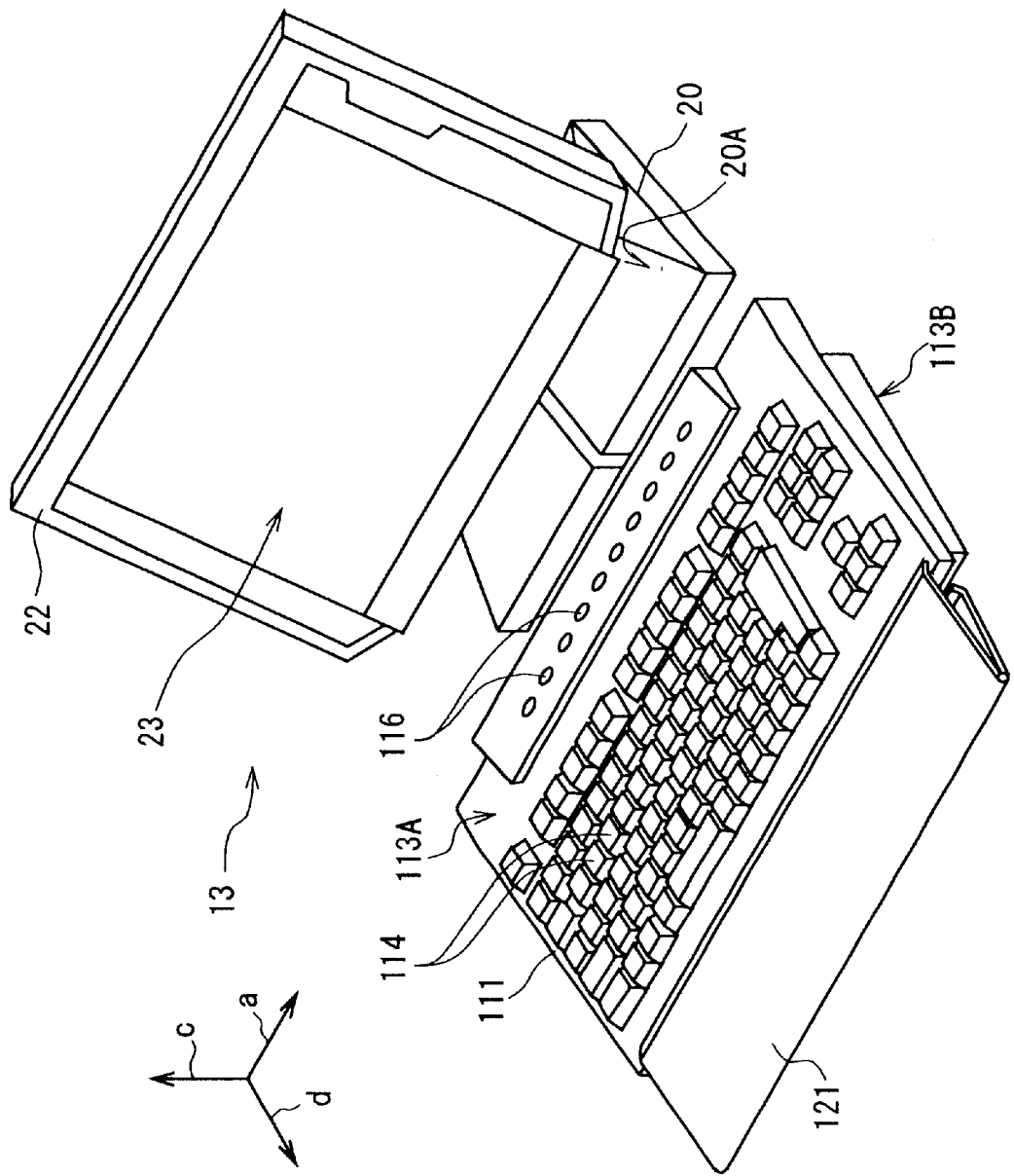
FIG. 13 is a perspective view explaining the arrangement of the time when the keyboard is used.
Figure 16:
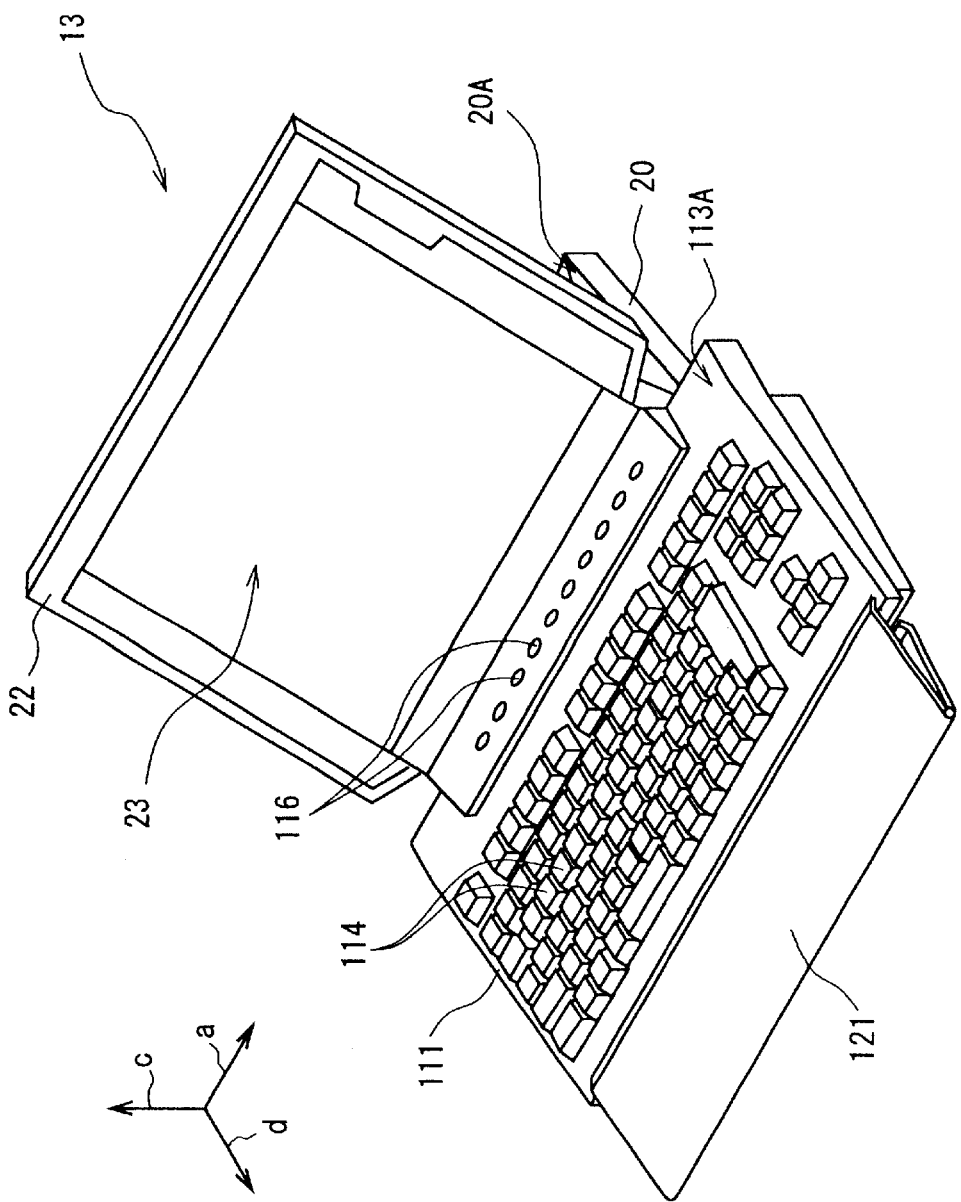
FIG. 16 is a perspective views explaining the integration of the keyboard and the liquid crystal display.

FIGS. 13 and 16 are views of arrangement of the keyboard 111 and the liquid crystal display 13 at the time when the keyboard 111 is manipulated.

And when manipulating this keyboard 111, as shown in FIG. 13, the keyboard 111 is disposed at a desired position separated from the liquid crystal display 13.

Figure 14:
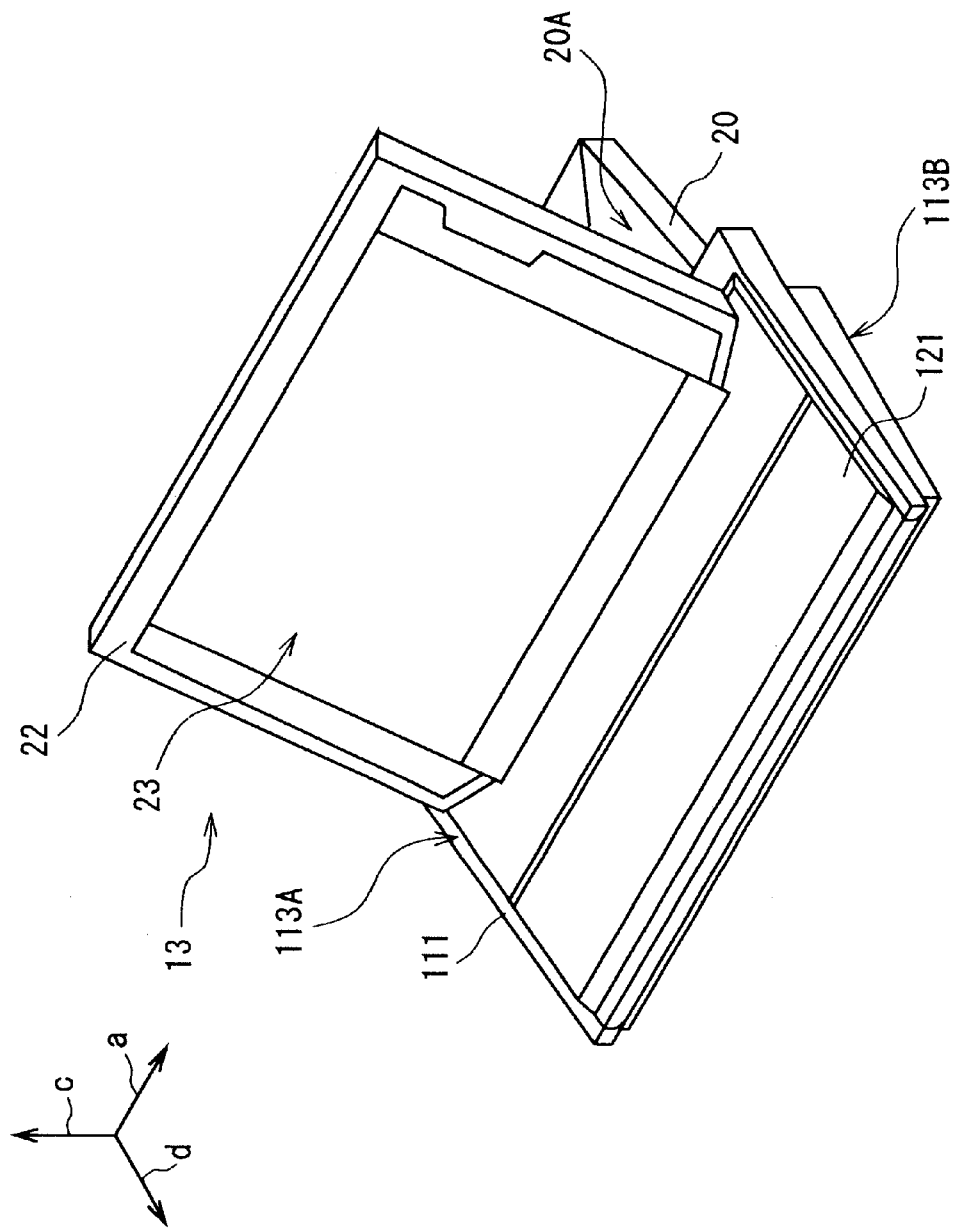
FIGS. 14 and 15 are perspective views explaining the situation where the keyboard is stowed.
Figure 15:
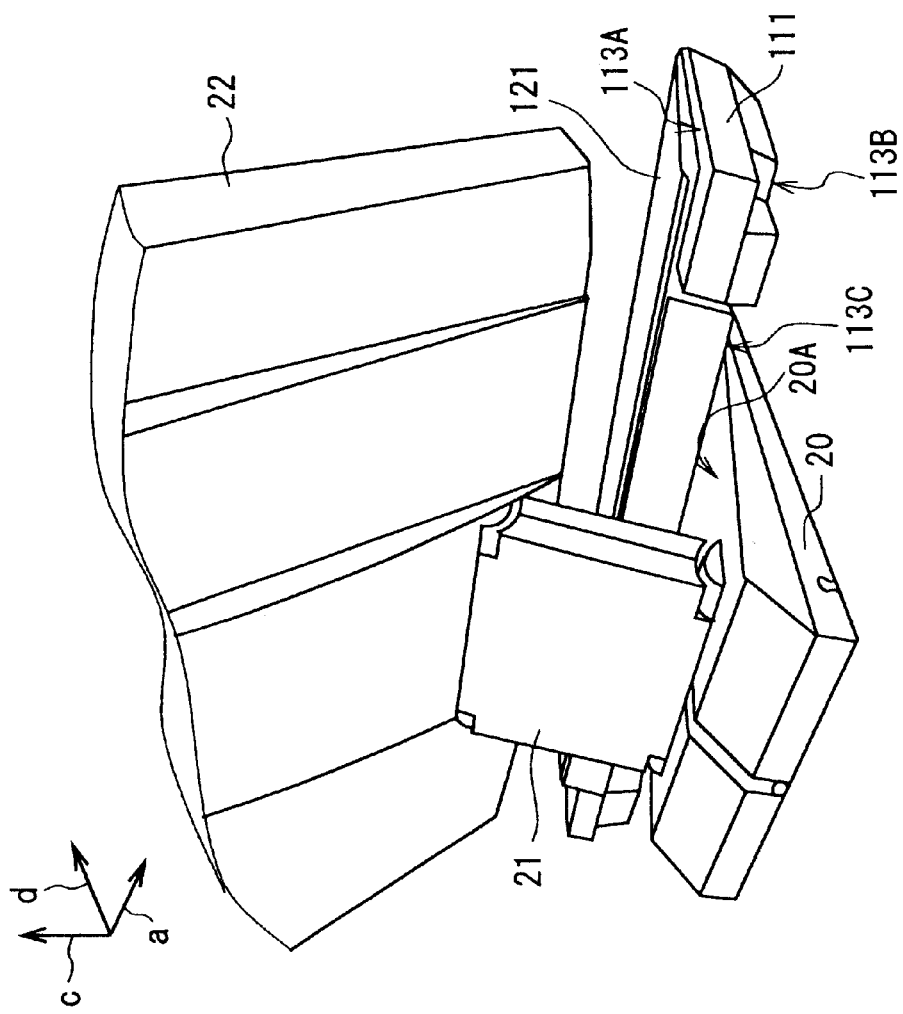

On the other hand, when storing the keyboard 111, as shown in FIGS. 14 and 15, the keyboard 111 is moved so that its back abuts on the arm 21 of the liquid crystal display 13, and the front part of the stand 20 is inserted into the concavity 113C of this keyboard 111.

In this manner, in this personal computer 10, the keyboard 111 can be stored under the panel 22 of the liquid crystal display 13 by placing the keyboard 111 on the one side 20A of the stand 20 using the concavity 113C.

Figure 1A:
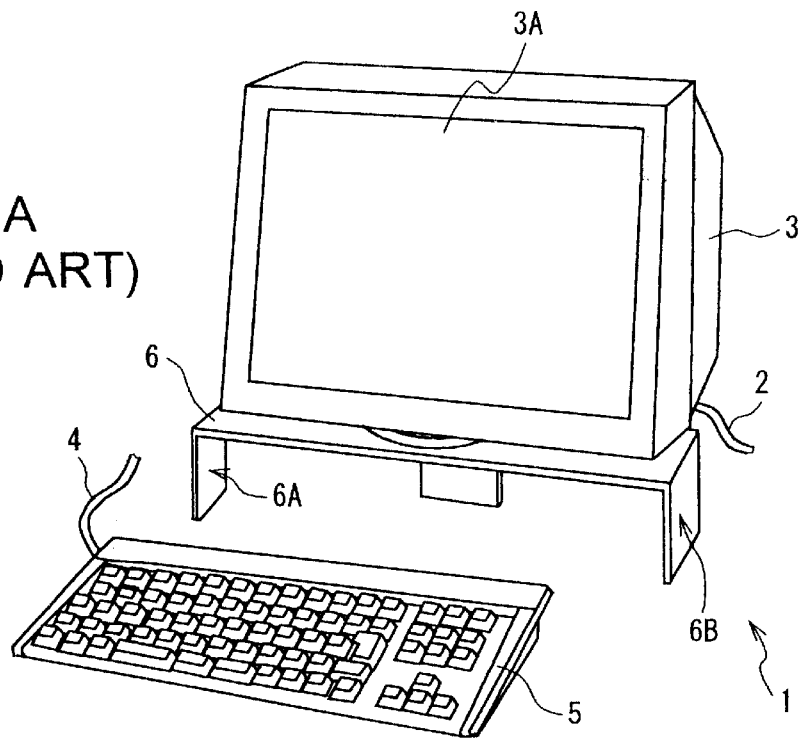
FIG. 1 is a schematic perspective view showing the configuration of a conventional personal computer.
Figure 1B:
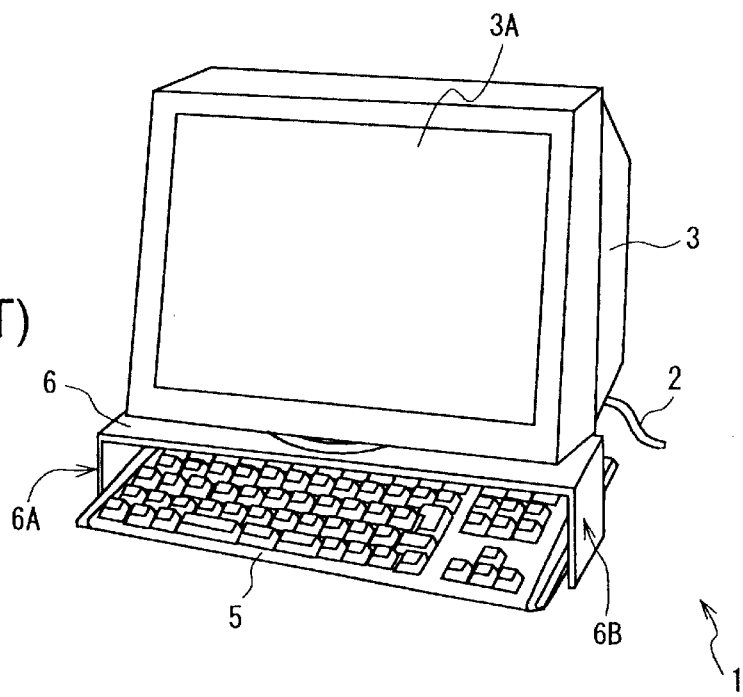

Therefore, in this personal computer 10, the keyboard 111 can be built in the liquid crystal display 13 to be stowed with effective use on a desk, without especially using a storing member larger than the keyboard 111 like the stand 6 (FIGS. 18A and 18B) used in the conventional personal computer 1 (FIGS. 1A and 1B).

Note that, in the personal computer 10 of this embodiment, as shown in FIG. 16, in the cases where the keyboard 111 is placed on the prescribed part of the front side of the stand 20 and where the keyboard 111 is disposed at a separated position from the stand 20 by a prescribed distance, the lower side of the panel 22 can be abutted on the rear side of the key-arranged surface 113A of this keyboard 111 by adjusting the inclination angle and height of the panel 22 of the liquid crystal display 13.

Therefore, in this personal computer 10, the keyboard 111 can be used as one body with the liquid crystal panel 13 at a desired position. It remarkably narrows the moving area of user's eyes between the keys 114 and the liquid crystal panel 23 when the keyboard 111 is manipulated, and it can extremely reduce eye fatigue, stiff neck and the like.

In this connection, in this personal computer 10, the parts from the panel 22 through the key-arranged surface 113A of the keyboard 111 to the keyboard cover 31 which is used as a palm rest are painted with the same color band when the keyboard 111 and the liquid crystal display 13 are unified. This paint improves unity feeling of the keyboard 111 and the liquid crystal display 13, and improves the visibility of the above liquid crystal panel 23 and the keys 114; it further reduces eye fatigue and stiff neck and the like.

According to the above configuration, in this personal computer 10, when the keyboard 111 is manipulated, the keyboard 111 is disposed at a desired position on the front side of the liquid crystal display 13, and when the keyboard 111 is stowed, the keyboard 111 is moved so that the stand 20 of the liquid crystal display 13 is inserted into the concavity 113C, and the above keyboard 111 is stowed so as to be placed on the one side 20A of the stand 20 using the concavity 113C.

Therefore, in this personal computer 10, the keyboard 111 can be stowed effectively using the underside of the panel 22 of the liquid crystal display 13 without using any storing member larger than the keyboard 111 like the stand 6 (FIGS. 18A and 18B) that is used in the conventional personal computer 1 (FIGS. 1A and 1B). Furthermore, since such a storing member is not necessary the personal computer 10 can be placed and the keyboard 111 can be stowed effectively using a desk for placing the personal computer 10.

In actual, in the personal computer 10, the inclination angle and height of the panel 22 can be adjusted in the liquid crystal display 13 and moreover, the keyboard case 112 can be stowed by being put on one surface 20A of the stand 20 of the liquid crystal display 13. As a result, the keyboard 111 can be stowed effectively using the lower side of the panel 22 of the liquid crystal display 13, ether the situation where the keyboard cover 121 is removed from the keyboard case 112, where the keyboard cover 121 attached to the keyboard case 112 cover the key-arranged surface 113A, or where the keyboard cover 121 is folded to be used as a palm rest.

By the way, it is generally known that when a human sees plural things, if the objects to be seen are aligned continuing along a prescribed spherical surface centering the eyes, the moving area of the eyes narrows and shifts of focal position are reduced, thus, fatigue on the eyes and neck are reduced.

Further, in the personal computer 10, the panel 22 of the liquid crystal display 13 is freely adjustable to a desired inclination angle and height, so that the liquid crystal panel 23 of the above panel 22 and the key-arranged surface 113A of the keyboard 111 can be integrally disposed along such a spherical surface at ease.

According to the above configuration, when being stowed, the above keyboard 111 is moved so that the stand 20 is inserted into the concavity 113C and the above keyboard 111 is stowed so as to be placed on the one side 20A of the stand 20 using the concavity 113C. As a result, the keyboard 111 can be stowed by effectively using the underside of the panel 22 of the liquid crystal display 13. Thus, a personal computer in which the stowing efficiency of the keyboard 111 is improved can be accomplished.

Note that, in the aforementioned embodiment, the cavity 113C suiting the shape of the front end of the stand 20 is provided on the outer surface 113B of the keyboard 111. However, the present invention is not only limited to this but in addition to this concavity 113C, a concavity suiting the shape and width of the front surface of the arm 21 can be provided on the back of the keyboard 111.

As a result, the keyboard 111 can be stowed by placing it on the one side 20A of the stand 20 using the concavity 113C and moving it more backward than the front of this arm 21. Thus, the underside of the panel 22 can be more effectively used than the aformentioned embodiment, and the stowing efficiency can be improved.

Further, in the aforementioned embodiment, the concavity 113C of which the bottom is in a taper shape is provided on the other side 113B of the keyboard 111. However, the present invention is not only limited to this but other various shapes can be applied for the concavity as long as the stand can be inserted into the concavity.

Further, in the aforementioned embodiment, the concavity 113C suiting the stand 20 is provided on the other surface 113B of the keyboard case 112. However, the present invention is not limited thereto and if the rocking pieces 137 are raised from the other surface 113B of the keyboard case 112 and the keyboard case 112 is stowed by being put on the stand 20 with a angle adjusted with respect to the placing surface, the back of the keyboard 112 is raised from the placing surface, so the concavity 113C of the other surface 113B which is shallow can be formed, which can make the keyboard case 112 thin.

Further, in the aformentioned embodiment, the present invention is applied to a desktop personal computer 10 having the liquid crystal display 13, and the keyboard 111 and the keyboard cover 121 used in the personal computer 10. However, the present invention is not only limited to this but also it can be applied to other various computer units, keyboards and keyboard covers, such as a desktop personal computer using a cathode-ray tube, a keyboard and a keyboard cover used in the above personal computer.

In the aformentioned embodiment, the liquid crystal display 13 structured as shown in FIG. 3 is applied as a display means. However, the present invention is not only limited to this but also various display means can be applied other than that, such as a liquid crystal display in which an arm and a panel are sequentially fixed on one side of a stand, a liquid crystal display in which a panel is supported freely on an arm fixed on one side of a stand so as to freely rotate, and one in which a base is separately used from a display panel or a cathode-ray tube.

Further, in the aformentioned embodiment, the rocking pieces 137 are used as angle adjusting mechanism for adjusting an angle of the keyboard with respect to the flat surface. However, the present invention is not limited thereto and various angle adjusting mechanism can be applied as long as angle of the keyboard with respect to the flat surface can be adjusted.

Figure 17:
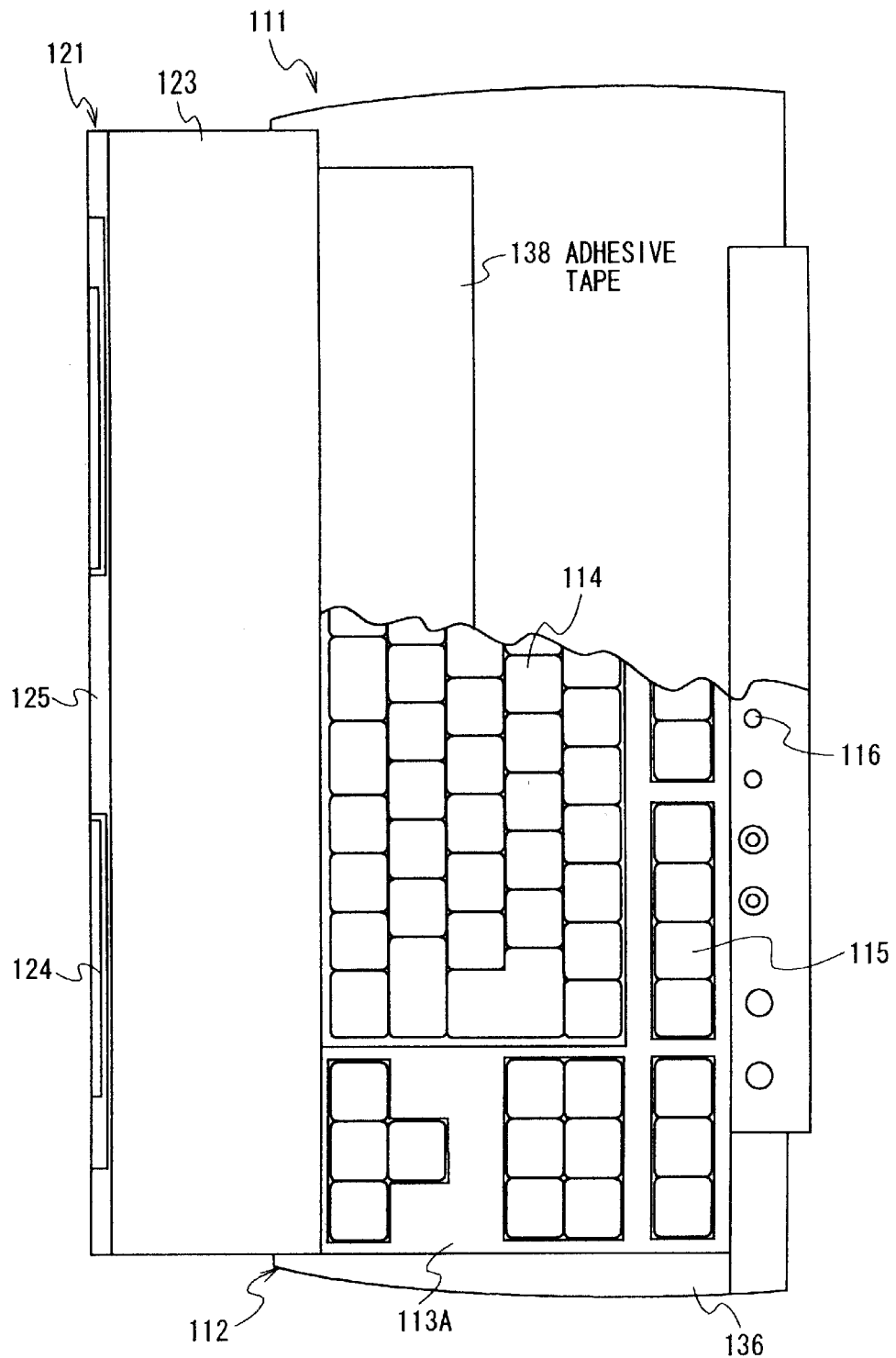

Furthermore, in the aforementioned embodiment, the hook parts are provided near the both ends of the first half cover 122 opposite to the connecting part 124 side, and the entire keyboard cover 121 is attached to the keyboard case 112 so as to rotate, by fitting these hook parts to the pins 118. However, the present invention is not limited thereto and as shown in FIG. 17, a keyboard 111 can be constructed similar to the aforementioned keyboard 111, except that the recessed parts 117, the pins 118 and the hook parts 126 are not provided in both the keyboard case 112 and the keyboard cover 121 in such a manner that the keyboard cover 121 is attached to the other surface 113B of the keyboard case 112 by the adhesive tape 138 such as both-side adhesive tape and surface zipper. Therefore, the keyboard cover 121 can be attached to the keyboard case 112 which does not have a hinge structure using the pins 118, so that the usability of the keyboard cover 121 can be improved.

According to the present invention as described above, in a computer unit a concavity is provided on the other surface of a keyboard opposite to the surface on which various control keys are arranged to enter various commands that will be supplied to a main body part, to insert a base that supports the display panel of a display means. By bringing the keyboard near the display panel and inserting the base into the concavity, this keyboard can be stowed effectively using the base without using any storing member. Thus, the computer unit in which the stowing efficiently of the keyboard is improved can be accomplished.

Moreover, in the keyboard described above, a concavity is provided on the other surface of the keyboard opposite to one surface on which various control keys are arranged to enter prescribed commands, to insert a base that supports a prescribed display panel. By bringing the keyboard near the display panel and inserting the base into the concavity, this keyboard can be stowed effectively using the base without using any storing member. Thus, the keyboard in which the stowing efficiency is improved can be accomplished.

Further, in the keyboard described above, when the keyboard is not used, the first and the second members of the keyboard cover are opened in the flat form to be changed to the keyboard cover, so that it is restrained that dust enters inside the keyboard, the exterior impression of the keyboard is simple, and accidental operation is prevented. On the other hand, when the keyboard is used, the folded first and second parts are changed to the palm rest; fatigue accompanied with key operation is less. Moreover, they are changed to the keyboard cover when the keyboard is not used, and they are arranged to the palm rest when the keyboard is used, so that the keyboard cover will be effectively used either when the keyboard is used or not used, and a storing space of the keyboard cover is unnecessary when the keyboards is not used.

Further, in the keyboard described above, a gap between each edge of the keyboard and the keyboard cover in a parallel direction to the first and second rocking shafts of the keyboard cover is narrow, which prevent dust from entering inside the keyboard when the keyboard is not used. In addition, the keyboard case and the keyboard cover looks one body and their appearance is good.

Further, in the keyboard described above, the angle of the keyboard case can be adjusted using the angle adjusting mechanism when the keyboard is used so as to be easily manipulated, and if the angle of the keyboard case is adjusted using the angle adjusting mechanism, the height from the placing surface for the keyboard to the edge of the keyboard case on the lowest row of keys hardly changes. In addition, the keyboard cover being used as a palm rest does not flow from the placing surface. As a result, it is very easy to manipulate the keys.

Further, in the keyboard cover described above, the first and second members are opened in a flat form to be a keyboard cover when the keyboard is not used, which prevents dust from entering inside the keyboard, the keyboard is neat and miss operation is prevented. Further, the first and second members are folded and used as a palm rest when the keyboard is used, which suppresses fatigue accompanied with key operation. In addition, they are used as a keyboard cover when the keyboard is not used and they are used as a palm rest when the keyboard is used, so that the keyboard cover is efficiently used ether when the keyboard is used or not used. As a result, the stowing space is not necessary for the time when the keyboard is not used.

Further, in the keyboard cover described above, the first and the second members can be easily opened and folded, so that it is easy to change them to the keyboard cover when the keyboard is not used and to the palm rest when the keyboard is used. In addition, since the tongue parts are not projected outward in either state where the first and the second parts are used as the keyboard cover or as the palm rest, the exterior impression is not deteriorated and any obstacle is not generated in key operation of the keyboard.

Further, the keyboard cover can be attached/removed to/from the keyboard as occasion demands, so that the usability of the keyboard is good.

Further, in the keyboard cover of claim 13, it is also able to attach the keyboard cover to a keyboard that does not have a hinge structure, so that the keyboard cover can be also attached to keyboards having an existing structure.

Further, in the keyboard described above, the first and the second members are hardly deformed by external force; the keyboard cover is hardly broken. In addition, since the ribs are not appeared outside in either state where the first and the second parts are used as the keyboard cover or as the palm rest, the exterior impression is not deteriorated and any obstacle is not generated in key operation of the keyboard. Moreover, since the keys are prevented from being pressed in a state where the first ad second members are used as a keyboard cover, the keys are hardly broken.

Further, in the keyboard described above a part of the keyboard can be covered not only when the keyboard is not used but also when the keyboard is used and the other keys than the hot keys are not used. Thereby, dust can be further presented from entering inside the keyboard, the exterior impression of the keyboard becomes more simple, and the hot keys seems to be easily operated.

Further, in the keyboard cover described above, when the first and the second members are used as the keyboard cover, the keyboard cover prevents the keys on the keyboard from being pressed, so that the keys are hardly broken.

Furthermore, in the keyboard cover described above the first and the second parts fit each other with a click when they are used as the palm rest, which stably keeps the palm rest situation.

While there has been described in connection with the preferred embodiments of the invention, it will be obvious to those skilled in the art that various changes and modifications may be aimed, therefore, to cover in the appended claims all such changes and modifications as fail within the true spirit and scope of the invention.

What is claimed is:

1. A computer unit including:
   a keyboard having control keys arranged on a first surface thereof for use by a user to enter commands to a main body part that executes signal processing; and
   display means separate from said keyboard and having a display panel for displaying contents of said signal processing supplied from said main body part, wherein the display panel is supported by and attached to a base having a tapered edge, wherein
   said keyboard is provided with a concavity for receiving said base supporting said display panel of said display means located on a second surface opposite to said first surface on which said controls keys are arranged.

2. The computer unit according to claim 1, wherein
   said concavity is formed on said second surface having a tapered shape in which one end facing said base is deeper than an other end, so as to receive said tapered edge of said base.

3. The computer unit according to claim 2, wherein
   said keyboard is provided with an angle adjusting mechanism for adjusting an angle of said keyboard relative to a flat surface arranged on said one end of said second surface.

4. A keyboard, including
   a tapered concavity to receive a tapered edge of a base for supporting a prescribed display panel provided on a second surface opposite to a first surface thereof on which control keys are arranged to enter prescribed commands.

5. The keyboard according to claim 4, wherein said tapered concavity has a shape in which one end facing said base is deeper than an other end to receive said tapered edge of said base.

6. The keyboard according to claim 5, further including an angle adjusting mechanism for adjusting an angle of the keyboard with respect to a flat surface, so that said concavity can receive said base in a situation where the angle of said keyboard is adjusted with respect to said flat surface using the angle adjusting mechanism.

7. A keyboard comprising:
   a keyboard cover having first and second members foldably connected to each other by a connecting part, wherein a shape in a plan view of said first and second members in an unfolded state corresponds to a shape of one surface of the keyboard having control keys arranged thereon,
   said first member has a hooked part on an edge of a side opposite to a side of the connecting part;
   said keyboard is attached to said first member with said hooked part at an edge of the keyboard at a lowest row side of keys;
   said connecting part is formed as a hinge; and
   said second member is wider than said first member in a direction perpendicular to an axis of said hinge.

8. The keyboard according to claim 7, wherein
   protrusions are provided on both ends of said keyboard cover and which protrude toward said one surface of the keyboard when said keyboard cover is covering said one surface of the keyboard.

9. The keyboard according to claim 7, further comprising
   an angle adjusting mechanism for adjusting an angle of the keyboard relative to a horizontal plane provided on a surface of the keyboard opposite to said one surface and at an edge of the keyboard opposite to the lowest row side of keys.

10. A keyboard cover comprising:
    first and second members foldably connected to each other by a connecting part, wherein a shape in a plan view of said first and second members in an unfolded state corresponds to a shape of one surface of a keyboard to be covered, said keyboard having control keys arranged thereon,
    said first member has a hooked part at an edge of a side opposite to the connecting part for attachment to the keyboard,
    said connecting part is in the form of hinge, and
    said second member is wider than said first member in a direction perpendicular to an axis of said hinge.

11. The keyboard cover according to claim 10, wherein
    said second member is provided with a pair of tongue parts projecting toward said one surface of said keyboard in a state where the second member faces said one surface of said keyboard, said pair of tongue parts being arranged at both edges of said second member.

12. The keyboard cover according to claim 10, comprising
    an adhesive tape for attaching said keyboard cover to said keyboard.

13. The keyboard cover according to claim 10, wherein
    ribs are provided on said first and second members at edge portions thereof facing locations on said one surface other than where said control keys are located.

14. The keyboard cover according to claim 10, wherein
    said shape in said plan view corresponds to portions other than hot keys on said one surface of the keyboard.

15. The keyboard cover according to claim 10, wherein
    protrusions are arranged on said first and second members so as to face portions of said one surface of the keyboard other than where said control keys are located on said one surface.

16. The keyboard cover according to claim 15, wherein
    one of said protrusions has a fitting part for fitting said first member to said second member when said keyboard cover is folded about said axis of said hinge.

* * * * *